United States Patent
Moriya (10) Patent No.: US 7,354,379 B2
(45) Date of Patent: Apr. 8, 2008

(54) ENGINE AUTOMATIC STOP RESTART CONTROL APPARATUS, VEHICLE EQUIPPED WITH ENGINE AUTOMATIC STOP RESTART CONTROL APPARATUS, AND ENGINE AUTOMATIC STOP RESTART METHOD

(75) Inventor: Kouki Moriya, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 196 days.

(21) Appl. No.: 11/294,440

(22) Filed: Dec. 6, 2005

(65) Prior Publication Data

US 2006/0142121 A1 Jun. 29, 2006

(30) Foreign Application Priority Data

Dec. 28, 2004 (JP) ............................. 2004-379585

(51) Int. Cl.
*F16D 59/02* (2006.01)
*F16D 65/14* (2006.01)
*G06F 19/00* (2006.01)
*G06G 7/70* (2006.01)

(52) U.S. Cl. .................... 477/199; 477/203; 701/112; 701/113; 701/118

(58) Field of Classification Search ............... 477/199, 477/182, 185; 701/117, 118, 112, 113, 301
See application file for complete search history.

(56) References Cited

U.S. PATENT DOCUMENTS 4,510,396 A * 4/1985 Uchida et al. ............ 290/30 R
5,653,659 A * 8/1997 Kunibe et al. ............... 477/111
6,456,230 B2 * 9/2002 Schwartz et al. .............. 342/71
6,529,818 B2 * 3/2003 Kitajima et al. ............. 701/112
6,533,081 B2 * 3/2003 Totsuka et al. .............. 188/110
2003/0150417 A1 * 8/2003 Miwa ....................... 123/179.4

FOREIGN PATENT DOCUMENTS

| JP | A 11-62650 | | 3/1999 |
| JP | 2000045807 A | * | 2/2000 |
| JP | A 2004-257271 | | 9/2004 |
| JP | A 2004-257272 | | 9/2004 |
| JP | A 2004-270532 | | 9/2004 |

* cited by examiner

*Primary Examiner*—Tisha Lewis
(74) *Attorney, Agent, or Firm*—Oliff & Berridge, PLC (57) ABSTRACT

In a vehicle having idle stop functions and low vehicle speed-following drive functions, when a vehicle automatic stop flag F2 is identified as 1 at step S220, determines whether all engine stop conditions except depression of brake pedal are satisfied in step S240. When it is determined all the engine stop conditions except depression of the brake pedal are satisfied, ignition and fuel injection in each cylinder of engine are stopped to automatically stop the engine in step S260. In this arrangement, the driver's depression of brake is excluded from the engine stop conditions. Therefore, even when the motor vehicle automatically stops without the driver's depression of brake, the engine is automatically stopped.

11 Claims, 6 Drawing Sheets

ENGINE AUTOMATIC STOP RESTART CONTROL APPARATUS, VEHICLE EQUIPPED WITH ENGINE AUTOMATIC STOP RESTART CONTROL APPARATUS, AND ENGINE AUTOMATIC STOP RESTART METHOD

BACKGROUND OF THE INVENTION

1. Field of the Invention

The present invention relates to an engine automatic stop restart control apparatus, a vehicle equipped with the engine automatic stop restart control apparatus, and a corresponding engine automatic stop restart method.

2. Description of the Prior Art

One proposed engine automatic stop restart control apparatus enables the driver to selectively set threshold values of predetermine engine stop conditions according to the running status and the driving conditions of a motor vehicle (see, for example, Japanese Patent Laid-Open Gazette No. 2004-270532). The threshold value of each engine stop condition is set by the driver's operation. For example, in an engine automatic stop control with the driver's depression of a brake pedal specified as one of the engine stop conditions, the driver may set the threshold value of the driver's depression power of a brake pedal. Such setting enables an automatic stop of the engine with reflection of the driver's preferences, the road conditions, and the driving conditions of the motor vehicle.

When the driver's depression of the brake pedal is specified as one of the engine stop conditions, the prior art engine automatic stop restart control apparatus only allows the driver to set the threshold value of the driver's depression power of the brake pedal. Namely the driver's depression of the brake pedal is an essential condition for an automatic stop of the engine. When the motor vehicle automatically stops without the driver's depression of the brake pedal, this prior art engine automatic stop restart control apparatus does not automatically stop the engine and causes wasteful consumption of the fuel. After an automatic stop of the motor vehicle, the driver is required to additionally depress the brake pedal for an automatic stop of the engine. This prior art engine automatic stop restart control apparatus requires the driver's useless additional operation to automatically stop the engine.

SUMMARY OF THE INVENTION

The object of the invention is to eliminate the drawbacks of the prior art apparatus and to automatically stop an engine in response to an automatic stop of a motor vehicle. The object of the invention is also to provide a vehicle equipped with an engine automatic stop restart control apparatus.

In order to achieve at least part of the above object, the present invention is constructed as follows.

The present invention is directed to an engine automatic stop restart control apparatus mounted on a motor vehicle that performs automatic engine stop control to automatically stop an engine in response to a driver's depression of brake as one of preset engine stop conditions and performs automatic engine restart control to automatically restart the engine in response to the driver's release of brake as one of preset engine restart conditions. The engine automatic stop restart control apparatus includes: an automatic drive control module that performs vehicle automatic stop control to automatically stop the motor vehicle upon satisfaction of predetermined vehicle stop conditions; an engine stop condition judgment module that determines whether all the preset engine stop conditions except the driver's depression of brake are satisfied after an automatic stop of the motor vehicle by the vehicle automatic stop control of the automatic drive control module; and an engine stop control module that performs the engine automatic stop control to automatically stop the engine when the engine stop condition judgment module determines satisfaction of all the preset engine stop conditions except the driver's depression of brake.

The engine automatic stop restart control apparatus of the invention excludes the driver's depression of brake from the engine stop conditions, when the motor vehicle automatically stops by the vehicle automatic stop control. Even when the motor vehicle automatically stops without the driver's depression of brake, the engine automatic stop restart control apparatus of the invention ensures an automatic stop of the engine and effectively improves the fuel consumption. This arrangement can automatically stop the engine in response to an automatic stop of the motor vehicle without requiring the driver's useless additional operation, for example, the driver's depression of brake.

In one preferable application of the engine automatic stop restart control apparatus of the invention, the predetermined vehicle stop conditions include at least a condition that a distance between the motor vehicle and an obstacle located ahead of the motor vehicle is not longer than a preset reference distance. When the motor vehicle automatically stops to avoid a collision against the obstacle located ahead of the motor vehicle, the engine automatic stop restart control apparatus of this application ensures an automatic stop of the engine and effectively improves the fuel consumption. The automatic stop of the engine does not require the driver's useless additional operation, for example, the driver's depression of brake. The 'reference distance' may be determined empirically to avoid a collision against the obstacle located ahead of the motor vehicle. This definition is adoptable to all the similar terminologies.

In another preferable application of the engine automatic stop restart control apparatus of the invention, the predetermined vehicle stop conditions include at least a condition that a vehicle speed of the motor vehicle is not higher than a preset reference vehicle speed and that a distance between the motor vehicle and a preceding vehicle is not longer than a preset reference distance. The automatic drive control module controls the motor vehicle to be driven at a constant speed or to follow the preceding vehicle and, in response to a stop of the preceding vehicle, controls the motor vehicle to automatically stop with maintaining the preset reference distance from the preceding vehicle. When the motor vehicle automatically stops with maintaining the preset reference distance from the preceding vehicle in the event of a stop of the preceding vehicle, the engine automatic stop restart control apparatus of this application ensures an automatic stop of the engine and effectively improves the fuel consumption. This arrangement can automatically stop the engine in response to an automatic stop of the motor vehicle without requiring the driver's useless additional operation, for example, the driver's depression of brake. The 'reference vehicle speed' may be determined experimentally as a vehicle speed that ensures a safe automatic stop of the motor vehicle with avoiding a collision against the preceding vehicle even in the event of a sudden stop of the preceding vehicle. The 'reference distance' may be determined empirically to avoid a collision against the preceding vehicle. These definitions are adoptable to all the similar terminologies.

In the engine automatic stop restart control apparatus of the invention, the driver's depression of brake may be included in the preset engine stop conditions when a gearshift lever is set in a drivable gear position.

In one preferable embodiment of the invention, the engine automatic stop restart control apparatus further includes a braking detection module that detects the driver's depression or release of brake. The automatic drive control module cancels the vehicle automatic stop control by the automatic drive control module, in response to detection of the driver's depression of brake by the braking detection module. When the vehicle automatic stop control is cancelled in response to the driver's depression of brake, standard idle stop control is performed to automatically stop the engine upon satisfaction of conventional engine stop conditions.

In another preferable embodiment of the invention, the engine automatic stop restart control apparatus further includes: an engine restart condition judgment module that determines whether the preset engine restart conditions except the driver's release of brake are satisfied in a state of sequential automatic stops of the motor vehicle and the engine by the vehicle automatic stop control of the automatic drive control module and by the engine automatic stop control of the, engine stop control module; a distance specification module that specifies whether a distance between the motor vehicle and an obstacle located ahead of the motor vehicle is longer than a preset reference distance; and an engine restart control module that performs the engine automatic restart control to automatically restart the engine when the engine restart condition judgment module determines satisfaction of all the preset engine restart conditions except the driver's release of brake and the distance specification module specifies that the distance between the motor vehicle and the obstacle located ahead of the motor vehicle is longer than the preset reference distance. The engine automatic restart control excludes the driver's release of brake from the preset engine restart conditions. Even when the engine automatically stops in response to an automatic stop of the motor vehicle without the driver's depression of brake, the engine automatic restart control is performed to automatically restart the engine without requiring the driver's useless additional operation, for example, the driver's sequential depression and release of brake. The engine automatic restart control is performed to automatically restart the engine when the distance between the motor vehicle and the obstacle located ahead of the motor vehicle is longer than the preset reference distance. This arrangement ensures an automatic restart of the engine even when the preset engine restart condition is only the driver's release of brake.

In one typical example, the obstacle is a preceding vehicle. The engine automatic stop restart control apparatus of the invention performs the engine automatic restart control to automatically restart the engine when the distance between the motor vehicle and the preceding vehicle is longer than the preset reference distance.

In the engine automatic stop restart control apparatus of the invention, the driver's release of brake may be included in the preset engine restart conditions when the gearshift lever is set in a drivable gear position.

The present invention is also directed to an engine automatic stop restart method that performs automatic engine stop control to automatically stop an engine in response to a driver's depression of brake as one of preset engine stop conditions and performs automatic engine restart control to automatically restart the engine in response to the driver's release of brake as one of preset engine restart conditions.

The engine automatic stop restart method includes the steps of: (a) performing vehicle automatic stop control to automatically stop the motor vehicle upon satisfaction of predetermined vehicle stop conditions; (b) determining whether all the preset engine stop conditions except the driver's depression of brake are satisfied after an automatic stop of the motor vehicle by the step (a); and (c) performing the engine automatic stop control to automatically stop the engine when the step (b) determines satisfaction of all the preset engine stop conditions except the driver's depression of brake.

The engine automatic stop restart method of the invention excludes the driver's depression of brake from the engine stop conditions, when the motor vehicle automatically stops by the vehicle automatic stop control. Even when the motor vehicle automatically stops without the driver's depression of brake, the engine automatic stop restart method of the invention ensures an automatic stop of the engine and effectively improves the fuel consumption. This arrangement can automatically stop the engine in response to an automatic stop of the motor vehicle without requiring the driver's useless additional operation, for example, the driver's depression of brake.

The present invention is further directed to a vehicle with the engine stop restart control apparatus of the invention described above. Even when the motor vehicle automatically stops without the driver's depression of brake, the vehicle of the invention ensures an automatic stop of the engine. This arrangement can automatically stop the engine in response to an automatic stop of the motor vehicle without requiring the driver's useless additional operation, for example, the driver's depression of brake.

DESCRIPTION OF THE PREFERRED EMBODIMENTS

Figure 1:
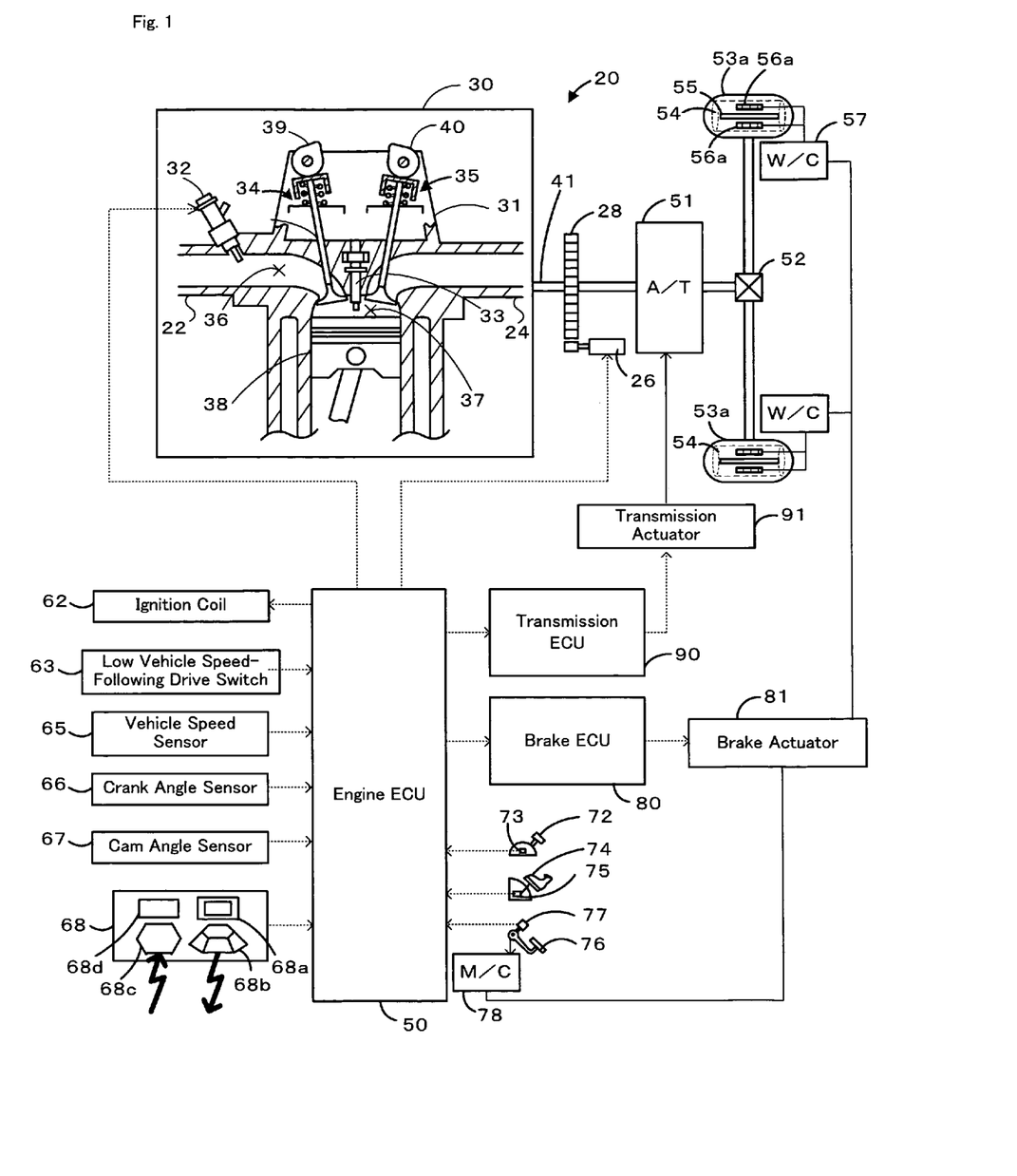
FIG. 1 schematically illustrates the configuration of a motor vehicle having idle stop functions and low vehicle speed-following drive functions in one embodiment of the invention.

One mode of carrying out the invention is described below as a preferred embodiment with reference to the accompanied drawings. FIG. 1 schematically illustrates the configuration of a motor vehicle 20 having idle stop functions and low vehicle speed-following drive functions in one embodiment of the invention. The motor vehicle 20 of the embodiment includes an engine 30 that is driven with a fuel, for example, gasoline, a starter motor 26 that starts the engine 30, an engine electronic control unit 50 (hereafter referred to as engine ECU) that controls the operations of the respective constituents of the engine 30, a brake electronic control unit 80 (hereafter referred to as brake ECU) that controls the operations of a brake actuator 81, and a transmission electronic control unit 90 (hereafter referred to as transmission ECU) that controls the operations of a transmission actuator 91. In the engine 30, an injector 32 injects the fuel (gasoline) into an intake port 36 of each of multiple cylinders 31, and an ignition plug 33 ignites a mixture of the intake air and the injected fuel (air-fuel mixture) in each cylinder 31.

The engine 30 is a 4-cylinder engine in this embodiment. Each of the four cylinders 31 is designed as a port structure, where gasoline is injected by the injector 32 into the intake port 36 provided before an intake valve 34 in an intake conduit 22. The air taken into the intake conduit 22 via an air cleaner and a throttle valve (not shown) is mixed with the atomized gasoline injected by the injector 32 in the intake port 36 to the air-fuel mixture. An intake cam 39 is operated to open the intake valve 34 and introduce the air-fuel mixture into a combustion chamber 37. The introduced air-fuel mixture is ignited with spark of the ignition plug 33 to be explosively combusted. The combustion energy of the air-fuel mixture moves back and forth a piston 38 to rotate a crankshaft 41. An exhaust cam 40 is operated to open an exhaust valve 35 and discharge the exhaust gas after the combustion from the combustion chamber 37 to an exhaust conduit 24. The four cylinders 31 in the engine 30 sequentially repeat a cycle of an intake stroke, a compression stroke, an expansion stroke (combustion stroke), and an exhaust stroke. Two rotations of the crankshaft 41, that is, 720 degrees, correspond to one cycle. The ignition timing of the four cylinders 31 shifts in the order of a first cylinder, a second cylinder, a fourth cylinder, and a third cylinder in this embodiment. For example, when the first cylinder is in the expansion stroke, the second cylinder, the third cylinder, and the fourth cylinder are respectively in the compression stroke, the exhaust stroke, and the intake stroke.

A flywheel 28 is provided on one end of the crankshaft 41 of the engine 30 to be exposed outside of the engine 30. The outer circumference of the flywheel 28 forms an external gear, which engages with an external gear formed on an edge of a rotating shaft of the starter motor 26 to start cranking at the time of engine start.

The crankshaft 41 of the engine 30 is linked to an automatic transmission 51. The automatic transmission 51 converts the power output from the engine 30 to the crankshaft 41 at a selected gear ratio and transmits the converted power via a differential gear 52 to drive wheels 53a,53a. The automatic transmission 51 is also connected to the transmission actuator 91 that is actuated to regulate the hydraulic pressure transmitted to the automatic transmission 51. The automatic transmission 51 upshifts or downshifts according to the hydraulic pressure transmitted and regulated by the transmission actuator 91.

A timing rotor (not shown) is attached to an output shaft of the automatic transmission 51 to rotate integrally with the output shaft. A vehicle speed sensor 65 is located to face the timing rotor. The vehicle speed sensor 65 adopted in this embodiment is an electromagnetic pickup sensor that measures the rotation speed of the output shaft of the automatic transmission 51. The outer circumference of the timing rotor has 18 teeth formed thereon. One pulse is output every time one of the 18 teeth on the timing rotor approaches to a core of the vehicle speed sensor 65. Namely 18 pulse signals are generated in one rotation of the output shaft of the automatic transmission 51. The vehicle speed at a start, under braking, or during a drive is calculated from the number of the output pulses.

Each of the drive wheels 53a,53a has a disk brake 54. The disk brake 54 includes a disk 55 that is integrated with the drive wheel 53a by means of bolts or equivalent elements, pads 56a,56a that are provided on both faces of the disk 55, and a wheel cylinder 57 that activates the pads 56a,56a. Under the condition of no application of the hydraulic pressure to the wheel cylinder 57, no braking force is generated since a piston (not shown) included in the wheel cylinder 57 does not press the pads 56a,56a against the disk 55. Under the condition of application of the hydraulic pressure to the wheel cylinder 57, on the contrary, some braking force is generated since the piston in the wheel cylinder 57 presses the pads 56a,56a against the disk 55. In one example of the application of the hydraulic pressure to the wheel cylinder 57, the driver's depression force of a brake pedal 76 is converted into the hydraulic pressure by a master cylinder 78 and is transmitted to the wheel cylinder 57. In another example, the hydraulic pressure is generated by actuation of the brake actuator 81 and is transmitted to the wheel cylinder 57. The brake actuator 81 is provided in a hydraulic circuit (not shown) between the master cylinder 78 and the wheel cylinder 57 and includes a solenoid valve and a pump.

A laser radar sensor 68 is disposed in a front portion of the motor vehicle 20. The laser radar sensor 68 includes a laser emitting unit 68a that includes a laser diode to emit a laser beam, a laser transmitter unit 68b that includes a polygon mirror to scan the laser beam emitted from the laser emitting unit 68a, a laser receiving unit 68c that includes a photo diode to receive the laser beam transmitted by the laser transmitter unit 68b and reflected by an object, and a computation unit 68d that detects a time elapsed before the transmitted and reflected laser beam enters the laser receiving unit 68c and an incoming angle of the reflected laser beam. In the structure of this embodiment, the laser transmitter unit 68b of the laser radar sensor 68 is set to irradiate a predetermined distance range of 0 to 35 meters ahead of the motor vehicle 20 with the laser beam. The laser beam is emitted from the laser emitting unit 68a of the laser radar sensor 68 and is radiated to the predetermined distance range ahead of the motor vehicle 20 by the laser transmitter unit 68b. When any preceding vehicle is present in the predetermined distance range of 0 to 35 meters ahead of the motor vehicle 20, the laser beam is reflected by a reflector or something equivalent of the preceding vehicle and comes back to the laser receiving unit 68c. The computation unit 68d detects the time elapsed before the laser beam radiated by the laser transmitter unit 68b is reflected and comes back to the laser receiving unit 68c and the incoming angle of the reflected laser beam. The computation unit 68d then computes a distance between the motor vehicle 20 and the preceding vehicle and a relative speed of the motor vehicle 20 to the preceding vehicle, based on these detected data. When no preceding vehicle is present in the predetermined distance range of 0 to 35 meters ahead of the motor vehicle 20, on the other hand, the laser beam radiated to the predetermined distance range by the laser transmitter unit 68b does not come back to the laser receiving unit 68c. The laser radar sensor 68 accordingly determines the absence of any preceding vehicle. The laser radar sensor 68 obtains preceding vehicle information, for example, the presence or the absence of a preceding vehicle, the distance from the preceding vehicle, and the relative speed of the motor vehicle 20 to the preceding vehicle.

The engine ECU 50 controls the operations of the engine 30 and is constructed as a microprocessor including a CPU, a ROM that stores processing programs and data, a RAM that temporarily stores data, input and output ports, and a communication port, which are not specifically illustrated in FIG. 1. The engine ECU 50 is connected with various sensors to detect the driving conditions of the engine 30 and receives detection signals from these sensors. Typical examples of these sensors include the vehicle speed sensor 65, the laser radar sensor 68, a crank angle sensor 66, a cam angle sensor 67, an intake air temperature sensor (not shown) that measures the temperature of the intake air, a throttle valve position sensor (not shown) that detects the opening or position of a throttle valve, and a water temperature sensor (not shown) that measures the temperature of cooling water (water temperature) in the engine 30. In order to make the engine 30 output a required power corresponding to the driver's operation, the engine ECU 50 also receives a gearshift position or current position of a gearshift lever 72 from a gearshift position sensor 73, an accelerator pedal position or current position of an accelerator pedal 74 from an accelerator pedal position sensor 75, an on/off signal representing depression or release of the brake pedal 76 from a brake pedal position sensor 77, and an operation signal from a low vehicle speed-following drive switch 63, which is activated by the driver's operation to set a low vehicle speed-following drive mode. The engine ECU 50 outputs driving signals to the starter motor 26 and the injector 32, as well as driving signals to an ignition coil 62 that applies a discharge voltage to the ignition plug 33. The engine ECU 50 is connected with the brake ECU 80 and with the transmission ECU 90 via the communication port and sends control signals to the brake ECU 80 and to the transmission ECU 90 according to the requirements. In the structure of this embodiment, drivable gear positions set by the gearshift lever 72 include a drive (D) position and $4^{th}$ speed, $3^{rd}$ speed, $2^{nd}$ speed, and $1^{st}$ speed positions.

The brake ECU 80 controls the operations of the brake actuator 81 and is constructed as a microprocessor including a CPU, a ROM that stores processing programs and data, a RAM that temporarily stores data, input and output ports, and a communication port, which are not specifically illustrated in FIG. 1. The brake ECU 80 receives the control signals output from the engine ECU 50 via the input port, while outputting control signals to the brake actuator 81 via the output port.

The transmission ECU 90 controls the operations of the transmission actuator 91 that includes a solenoid valve provided in a hydraulic circuit to actuate planetary gears and a torque converter (not shown) included in the automatic transmission 51. The transmission ECU 90 is constructed as a microprocessor including a CPU, a ROM that stores processing programs and data, a RAM that temporarily stores data, input and output ports, and a communication port, which are not specifically illustrated in FIG. 1. The transmission ECU 90 receives the control signals output from the engine ECU 50 via the input port, while outputting control signals to the transmission actuator 91 via the output port.

The description regards the operations of the motor vehicle 20 of the embodiment constructed as discussed above, especially a series of drive control for a vehicle automatic stop in the low vehicle speed-following drive mode. Under the ON setting of the low vehicle speed-following drive switch 63, when the vehicle speed of the motor vehicle 20 decreases to or below a preset reference vehicle speed, for example, 30 km/hour, the low vehicle speed-following drive control causes the motor vehicle 20 to follow a preceding vehicle with maintaining a target distance from the preceding vehicle, which depends upon the vehicle speed of the preceding vehicle. Under the ON setting of the low vehicle speed-following drive switch 63, when the preceding vehicle stops, the low vehicle speed-following drive control causes the motor vehicle 20 to automatically stop with maintaining the target distance specified as a minimum distance L0 from the preceding vehicle. The low vehicle speed-following drive control automatically starts the motor vehicle 20 when the distance from the preceding vehicle increases to or over a preset reference distance L1, which is the criterion for assumption of a start of the preceding vehicle. The low vehicle speed-following drive control includes vehicle automatic stop control as described below. The low vehicle speed-following drive control does not cause the motor vehicle 20 to start the low vehicle speed-following drive even under the ON setting of the low vehicle speed-following drive switch 63 when the vehicle speed of the motor vehicle 20 does not decrease to or below the preset reference vehicle speed.

Figure 2:
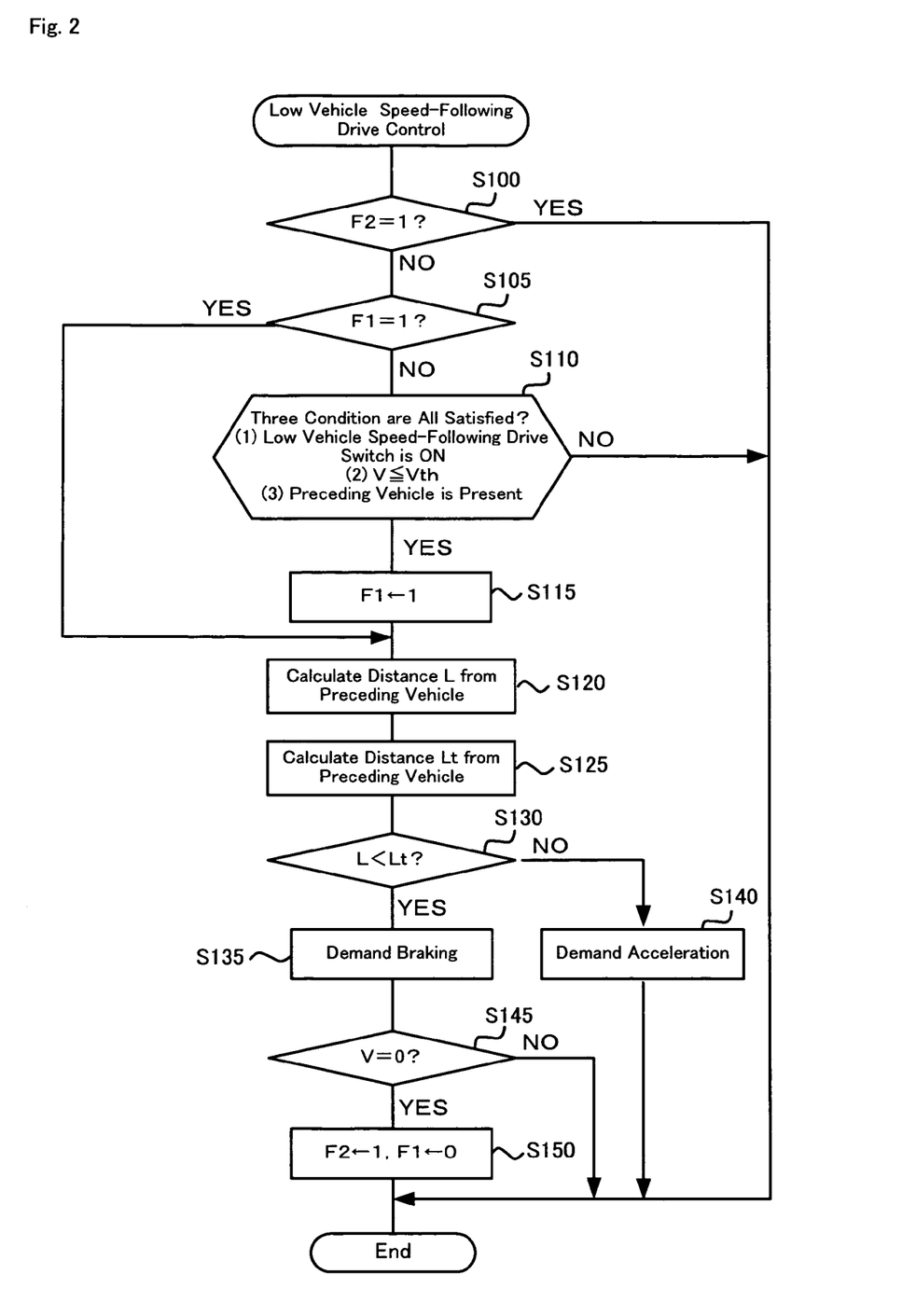
FIG. 2 is a flowchart showing a low vehicle speed-following drive control routine executed in the motor vehicle of the embodiment.

FIG. 2 is a flowchart showing a low vehicle speed-following drive control routine executed in the motor vehicle 20 of the embodiment. This drive control routine is executed by the engine ECU 50 at preset timings (for example, at every several msec) during a drive of the motor vehicle 20. In the low vehicle speed-following drive control routine, the engine ECU 50 first identifies whether a vehicle automatic stop flag F2 is equal to 1 (step S100). The vehicle automatic stop flag F2 specifies whether the motor vehicle 20 is in an automatic stop by the vehicle automatic stop control in this low vehicle speed-following drive control routine. The vehicle automatic stop flag F2 set equal to 1 indicates the state of vehicle automatic stop. The vehicle automatic stop fag F2 set equal to 0 indicates the state of no vehicle automatic stop. When the vehicle automatic stop flag F2 is identified as 0 at step S100, the engine ECU 50 subsequently identifies whether a following drive execution flag F1 is equal to 1 (step S105). The following drive execution flag F1 specifies whether the engine ECU 50 is in execution of low vehicle speed-following drive control. The following drive execution flag F1 set equal to 1 indicates execution of the low vehicle speed-following drive control. The following drive execution flag F1 set equal to 0 indicates no execution of the low vehicle speed-following drive control.

When the following drive execution flag F1 is identified as 0 at step S105, the engine ECU 50 determines whether preset three conditions are all satisfied: (1) the low vehicle speed-following drive switch 63 is set ON; (2) the vehicle speed V of the motor vehicle 20 decreases to or below a preset reference vehicle speed Vth; and (3) any preceding vehicle is present in a predetermined distance range ahead on the drive line of the motor vehicle 20 (step S110). Upon failure of at least one of these three conditions, execution of the low vehicle speed-following drive control is not required. The engine ECU 50 thus immediately exits from the low vehicle speed-following drive control routine without any further processing. Upon satisfaction of all these three conditions, on the other hand, the following drive execution flag F1 is set equal to 1 (step S115). The reference vehicle speed Vth is determined experimentally as a vehicle speed that ensures a safe automatic stop of the motor vehicle in the following drive with avoiding a collision against the preceding vehicle even in the event of a sudden stop of the preceding vehicle. The vehicle speed V of the motor vehicle 20 is computed from the number of pulses output from the vehicle speed sensor 65 as the rotation speed of the output shaft of the automatic transmission 51. The presence or the absence of the preceding vehicle is detected, based on data of reflection when the laser beam emitted from the laser radar sensor 68 is reflected from the preceding vehicle. In the structure of this embodiment, the laser transmitter unit 68b of the laser radar sensor 68 is set to irradiate the predetermined distance range of 0 to 35 meters ahead of the motor vehicle 20 with the laser beam. When any preceding vehicle is present in the predetermined distance range ahead of the motor vehicle 20, the laser beam radiated to this distance range by the laser transmitter unit 68b of the laser radar sensor 68 is reflected by a reflector or something equivalent of the preceding vehicle and comes back to the laser receiving unit 68c. When no preceding vehicle is present in this distance range, on the other hand, the laser beam radiated by the laser transmitter unit 68b does not come back to the laser receiving unit 68c. Detection of the reflected light accordingly determines the presence or the absence of the preceding vehicle.

When the following drive execution flag F1 is identified as 1 at step S105 or after the following drive execution flag F1 is set equal to 1 at step S115, the engine ECU 50 calculates a distance L between the motor vehicle 20 and the preceding vehicle (step S120). The computation of the distance L is based on the data of the reflection detected by the laser radar sensor 68, as described above with regard to the processing of step S110. The computation unit 68d of the laser radar sensor 68 detects data of the reflection when the laser beam radiated by the laser transmitter unit 68b is reflected and comes back to the laser receiving unit 68c, more concretely the time elapsed before the radiated laser beam comes back as the reflected light and the incoming angle of the reflected laser beam. The engine ECU 50 calculates the distance L between the motor vehicle 20 and the preceding vehicle, based on the data of the reflection at step S120.

Figure 3:
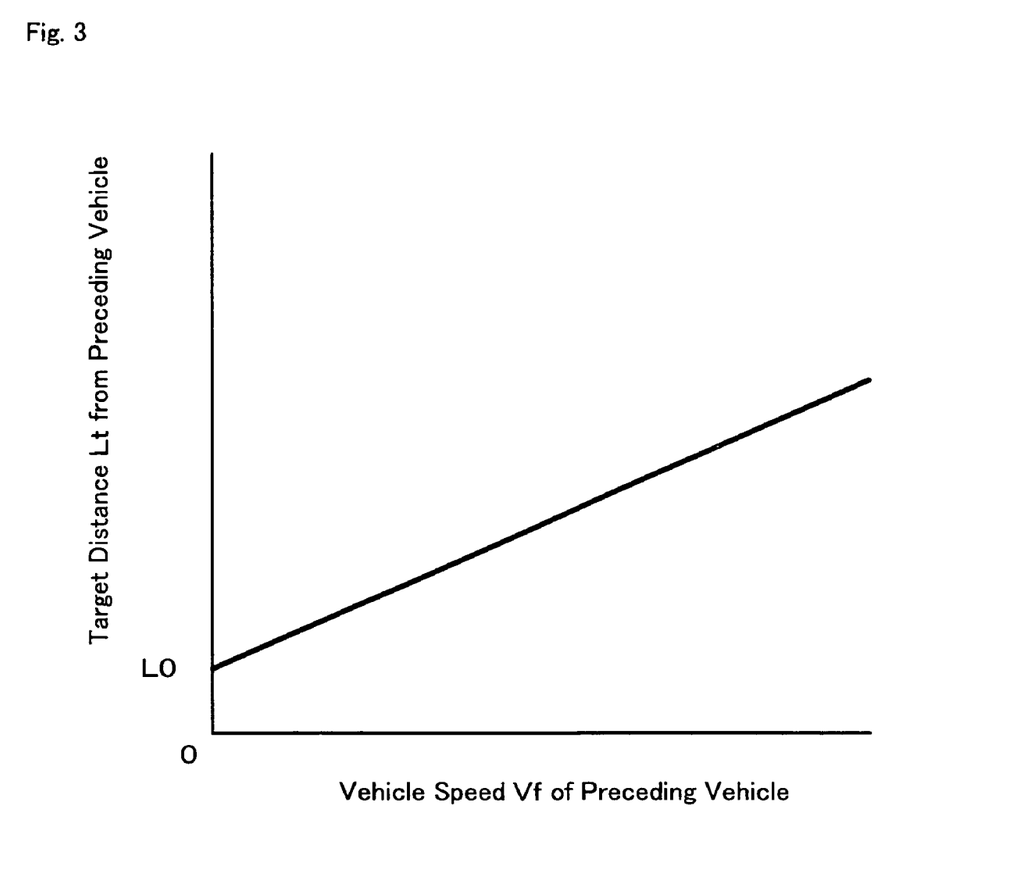
FIG. 3 is a map showing a variation in target distance Lt from a preceding vehicle against vehicle speed Vf of the preceding vehicle.

The engine ECU 50 subsequently sets a target distance Lt between the motor vehicle 20 and the preceding vehicle, based on a vehicle speed Vf of the preceding vehicle (step S125). The vehicle speed Vf of the preceding vehicle is calculated from the vehicle speed V of the motor vehicle 20 and the relative speed of the motor vehicle 20 to the preceding vehicle. The vehicle speed V of the motor vehicle 20 is computed from the number of pulses output from the vehicle speed sensor 65. The relative speed is computed from the data of the reflection detected by the laser radar sensor 68. FIG. 3 is a map showing a variation in target distance Lt from the preceding vehicle against the vehicle speed Vf of the preceding vehicle. In the map of FIG. 3, the target distance Lt at the vehicle speed Vf of the preceding vehicle equal to 0 is defined as the minimum distance L0. The target distance Lt is set to increase with an increase in vehicle speed Vf of the preceding vehicle. The calculated distance L is compared with the target distance Lt (step S130). When the calculated distance L is shorter than the target distance Lt, the engine ECU 50 demands braking and instructs the brake ECU 80 to actuate the brake actuator 81 for braking (step S135). The brake ECU 80 then controls an inner pump of the brake actuator 81 to generate the hydraulic pressure and transmit the generated hydraulic pressure to the wheel cylinder 57. In response to the transmitted hydraulic pressure, the piston (not shown) in the wheel cylinder 57 presses the pads 56a,56a against the disk 55. A frictional force is accordingly produced between the respective pads 56a,56a and the disk 55 to automatically decelerate or stop the motor vehicle 20. In addition to or in place of the braking demand at step S135, the engine ECU 50 may instruct the transmission ECU 90 to actuate the transmission actuator 91 for downshifting. When the calculated distance L is not shorter than the target distance Lt at step S130, on the other hand, the engine ECU 50 demands acceleration and opens the throttle valve (not shown) to increase the torque of the engine 30 (step S140). The greater opening of the throttle valve raises the intake air flow. The increased amount of fuel injection accompanied with the raised intake air flow increases the output power of the engine 30 to automatically accelerate the motor vehicle 20. After the acceleration demand at step S140, the engine ECU 50 exits from the low vehicle speed-following drive control routine. In addition to or in place of the acceleration demand t step S140, the engine ECU 50 may instruct the transmission ECU 90 to actuate the transmission actuator 91 for upshifting.

After the braking demand at step S135, the engine ECU 50 determines whether the vehicle speed V of the motor vehicle 20 is approximately equal to 0 (step S145). When the vehicle speed V is not approximately equal to 0, the engine ECU 50 exits from the low vehicle speed-following drive control routine without any further processing. When the vehicle speed V is approximately equal to 0, on the other hand, the engine ECU 50 sets the vehicle automatic stop fag F2 to 1 and resets-the following drive execution flag F1 to 0 (step S150) before exiting from the low vehicle speed-following drive control routine. The low vehicle speed-following drive control of this embodiment enables automatic drive of the motor vehicle 20 with maintaining the target distance Lt from the preceding vehicle. When the preceding vehicle stops, the braking demand is given in every repeated cycle of this drive control routine. The repeated braking demand eventually makes an automatic stop of the motor vehicle 20. The vehicle automatic stop control by this drive control routine is cancelled in response to detection of the driver's depression of the brake pedal 76 by the brake pedal position sensor 77.

Idle stop control of the engine 30 includes engine automatic stop control and engine automatic restart control described below.

The engine automatic stop control is described with reference to the flowchart of FIG. 4. The engine automatic stop control routine is executed at preset timings, for example, at every several msec, by the engine ECU 50. In the engine automatic stop control routine, the engine ECU 50 first determines whether the engine 30 is in operation (step S200). When the engine 30 is not in operation, the engine ECU 50 immediately exits from this engine automatic stop control routine without any further processing. When the engine 30 is in operation at step S200, the engine ECU 50 identifies whether a stop control execution flag F3 is equal to 1 (step S210). The stop control execution flag F3 specifies-whether the engine ECU 50 is in execution of automatic stop control of the engine 30. The stop control execution flag F3 set equal to 1 indicates execution of automatic stop control of the engine 30. The stop control execution flag F3 set equal to 0 indicates no execution of automatic stop control of the engine 30. When the stop control execution flag F3 is identified as 0 at step S210, the engine ECU 50 subsequently identifies whether the vehicle automatic stop flag F2 is equal to 1 (step S220). When the vehicle automatic stop flag F2 is identified as 0 at step S220, the engine ECU 50 determines whether all engine stop conditions are satisfied to perform standard idle stop control (step S230). The engine stop conditions are: (1) the gearshift lever 72 is set in a drivable gear position; (2) the brake pedal 76 is depressed; (3) the inner pressure of the master cylinder 78 is not higher than a preset reference level: and (4) the vehicle speed V is equal to 0. When the vehicle automatic stop flag F2 is identified as 1 at step S220, on the other hand, the engine ECU 50 determines whether all the engine stop conditions except depression of the brake pedal 76 are satisfied (step S240). When the motor vehicle 20 automatically stops by the low vehicle speed-following drive control without the driver's depression of the brake pedal 76, the engine ECU 50 excludes depression of the brake pedal 76 from the engine stop conditions and determines whether all the engine stop conditions except depression of the brake pedal 76 are satisfied.

Upon failure of at least one of the engine stop conditions at step S230 or upon failure of at least one of the engine stop conditions except depression of the brake pedal 76 at step S240, the engine ECU 50 immediately exits from the engine automatic stop control routine without any further processing. Upon satisfaction of all the engine stop conditions at step S230 or upon satisfaction of all the engine stop conditions except depression of the brake pedal 76 at step S240, on the other hand, the engine ECU 50 sets the stop control execution flag F3 to 1 (step S250) and cuts off the power supply to the injector 32 for each of the multiple cylinders 31 in the engine 30 and the power supply to the ignition coil 62 for the ignition plug 33 (step S260). The cutoff of the power supply stops ignition and fuel injection in each cylinder 31 of the engine 30 and thereby causes the engine 30 to generate no torque for rotating the crankshaft 41. The crankshaft 41 accordingly rotates by means of only the inertial force. The inertial force is attenuated by the gas compression force produced in the cylinder 31 in the compression stroke to fully stop the rotation of the crankshaft 41.

When the stop control execution flag F3 is identified as 1 at step S210 or after the stop of ignition and fuel injection in each of the cylinder 31 of the engine 30 at step S260, the engine ECU 50 determines whether an engine rotation speed Ne has reached 0 (step S270). When the engine rotation speed Ne has not yet reached 0, the engine ECU 50 exits from the engine automatic stop control routine without any further processing. The engine rotation speed Ne is computed from the time interval of the output pulses from the crank angle sensor 66. When the engine rotation speed Ne has reached 0 at step S270, on the other hand, the engine ECU 50 resets the stop control execution flag F3 to 0 (step S280), before exiting from the engine automatic stop control routine. The idle stop control makes an automatic stop of the engine 30 when the motor vehicle 20 automatically stops by the low vehicle speed-following drive control without the driver's depression of the brake pedal 76.

Figure 5:
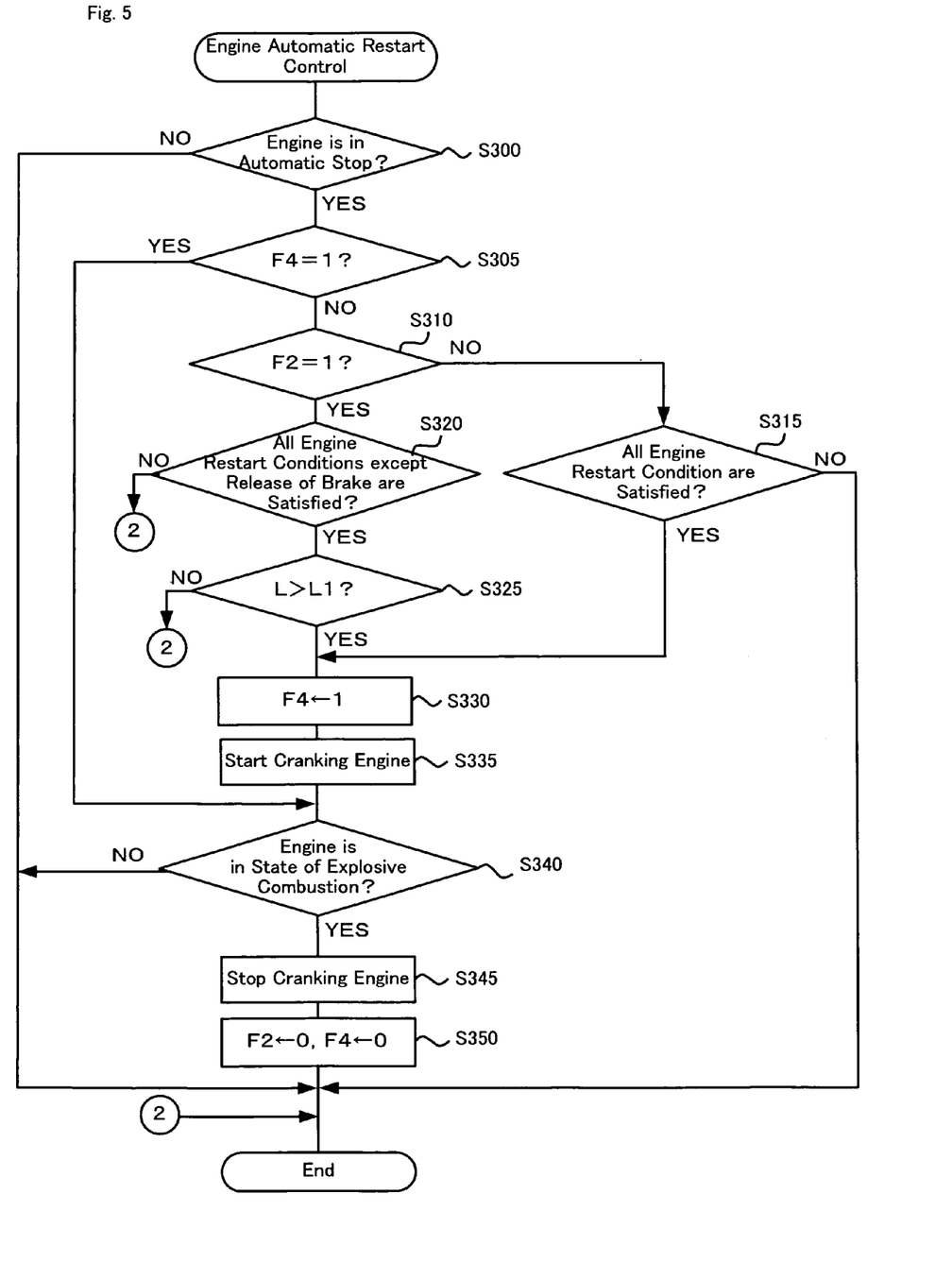
FIG. 5 is a flowchart showing an engine automatic restart control routine.

The engine automatic restart control is described with reference to the flowchart of FIG. 5. The engine automatic restart control routine is executed at preset timings, for example, at every several msec, by the engine ECU 50. In the engine automatic restart control routine, the engine ECU 50 first determines whether the engine 30 is in an automatic stop by the engine automatic stop control described above (step S300). When the engine 30 is not in an automatic stop, the engine ECU 50 immediately exits from this engine automatic restart control routine without any further processing. When the engine 30 is in an automatic stop, on the other hand, the engine ECU 50 identifies whether a restart control execution flag F4 is equal to 1 (step S305). The restart control execution flag F4 specifies whether the engine ECU 50 is in execution of automatic restart control of the engine 30. The restart control execution flag F4 set equal to 1 indicates execution of automatic restart control of the engine 30. The restart control execution flag F4 set equal to 0 indicates no execution of automatic restart control of the engine 30. When the restart control execution flag F4 is identified as 0 at step S305, the engine ECU 50 subsequently identifies whether the vehicle automatic stop flag F2 is equal to 1 (step S310). When the vehicle automatic stop flag F2 is identified as 0 at step S310, the engine ECU 50 determines whether all engine restart conditions are satisfied (step S315). The engine restart conditions are: (1) the gearshift lever 72 is set in a drivable gear position; (2) the brake pedal 76 is released; and (3) the inner pressure of the master cylinder 78 is lower than a preset reference level. When the vehicle automatic stop flag F2 is identified as 1 at step S310, on the other hand, the engine ECU 50 determines whether all the engine restart conditions except release of the brake pedal 76 are satisfied (step S320). Upon satisfaction of all the engine restart conditions except release of the brake pedal 76 at step S320, the calculated distance L from the preceding vehicle is compared with a preset reference distance L1 (step S325). When the motor vehicle 20 automatically stops by the vehicle automatic stop control in the low vehicle speed-following drive control without the driver's depression of the brake pedal 76 and the engine 30 automatically stops by the engine automatic stop control, the engine ECU 50 excludes release of the brake pedal 76 from the engine restart conditions and determines whether all the engine restart conditions except release of the brake pedal 76 are satisfied. Upon satisfaction of all the engine restart conditions except release of the brake pedal 76, the engine ECU 50 compares the calculated distance L from the preceding vehicle with the preset reference distance L1. The reference distance L1 is empirically specified as the criterion for assumption of a start of the preceding vehicle and is, for example, slightly greater than the minimum distance L0.

Upon failure of at least one of the engine restart conditions at step S315, upon failure of at least one of the engine restart conditions except release of the brake pedal 76 at step S320, or under the condition that the calculated distance L from the preceding vehicle is not longer than the preset reference distance L1 at step S325, the engine ECU 50 immediately exits from the engine automatic restart control routine without any further processing. Upon satisfaction of all the engine restart conditions at step S315 or under the condition that the calculated distance L from the preceding vehicle is longer than the preset reference distance L1 at step S325, on the other hand, the engine ECU 50 sets the restart control execution flag F4 to 1 (step S330). The engine ECU 50 then protrudes the rotating shaft of the starter motor 26 to make the external gear formed on the edge of the rotating shaft engage with the external gear formed on the flywheel 28 and supplies the electric power to the starter motor 26 (step S335). Engagement of the external gear on the edge of the rotating shaft of the starter motor 26 with the external gear on the flywheel 28 rotates the flywheel 28 and the crankshaft 41 to start cranking the engine 30. In response to identification of the restart control execution flag F4 as 1 at step S305 or after the start of cranking the engine 30 at step S335, the engine ECU 50 determines whether the engine 30 is in the state of explosive combustion (step S340). When the engine 30 is not in the state of explosive combustion, the engine ECU 50 exits from the engine automatic restart control routine without any further processing. When the engine 30 is in the state of explosive combustion, on the other hand, the engine ECU 50 thrusts back the rotating shaft of the starter motor 26 to its original position to stop cranking the engine 30 (step S345) and resets both the vehicle automatic stop flag F2 and the restart control execution flag F4 to 0 (step S350). The engine ECU 50 then terminates the engine automatic restart control and executes general drive control.

The engine ECU 50 in the structure of this embodiment corresponds to the automatic drive control module, the engine stop condition judgment module, the engine stop control module, the engine restart condition judgment module, the distance specification module, and the engine restart control module of the invention. The brake pedal position sensor 77 of the embodiment is equivalent to the braking detection module of the invention. The operations of the motor vehicle 20 of the embodiment are described above as concrete examples of the engine automatic stop restart control apparatus and the corresponding engine automatic stop restart method of the invention.

When the motor vehicle 20 is in an automatic stop by the low vehicle speed-following drive control, the engine automatic stop control is performed to automatically stop the engine 30 upon satisfaction of all the engine stop conditions except depression of the brake pedal 76. Even when the motor vehicle 20 automatically stops without the driver's depression of the brake pedal 76, this drive control of the embodiment ensures an automatic stop of the engine 30 and effectively improves the fuel consumption. The drive control of the embodiment can automatically stop the engine 30 in response to an automatic stop of the motor vehicle 20 without requiring the driver's useless additional operation, for example, the driver's depression of the brake pedal 76.

When the presence of any obstacle, for example, a preceding vehicle, is detected in the predetermined distance range ahead on the drive line of the motor vehicle 20 by the laser radar sensor 68 at step S110, the vehicle automatic stop control in the low vehicle speed-following drive control routine is performed to automatically stop the motor vehicle 20. In response to an automatic stop of the motor vehicle 20, the engine automatic stop control is triggered to automatically stop the engine 30.

In response to sequential automatic stops of the motor vehicle 20 and the engine 30 by the low vehicle speed-following drive control and by the engine automatic stop control, the engine automatic restart control is triggered to automatically restart the engine 30 at step S335 under the condition that the calculated distance L from the preceding vehicle is longer than the preset reference distance L1 at step S325. Namely this drive control enables an automatic restart of the engine 30 upon satisfaction of all the engine restart conditions except release of the brake pedal 76.

The idle stop control repeats the stop and the restart of the engine 30 during the drive of the motor vehicle 20, thus advantageously accumulating the saving effect of the fuel consumption.

When the vehicle automatic stop control is cancelled in response to the driver's depression of the brake pedal 76 in execution of the low vehicle speed-following drive control, standard idle stop control is performed to automatically stop the engine 30 upon satisfaction of conventional engine stop conditions.

The embodiment discussed above is to be considered in all aspects as illustrative and not restrictive. There may be many modifications, changes, and alterations without departing from the scope or spirit of the main characteristics of the present invention.

Figure 6:
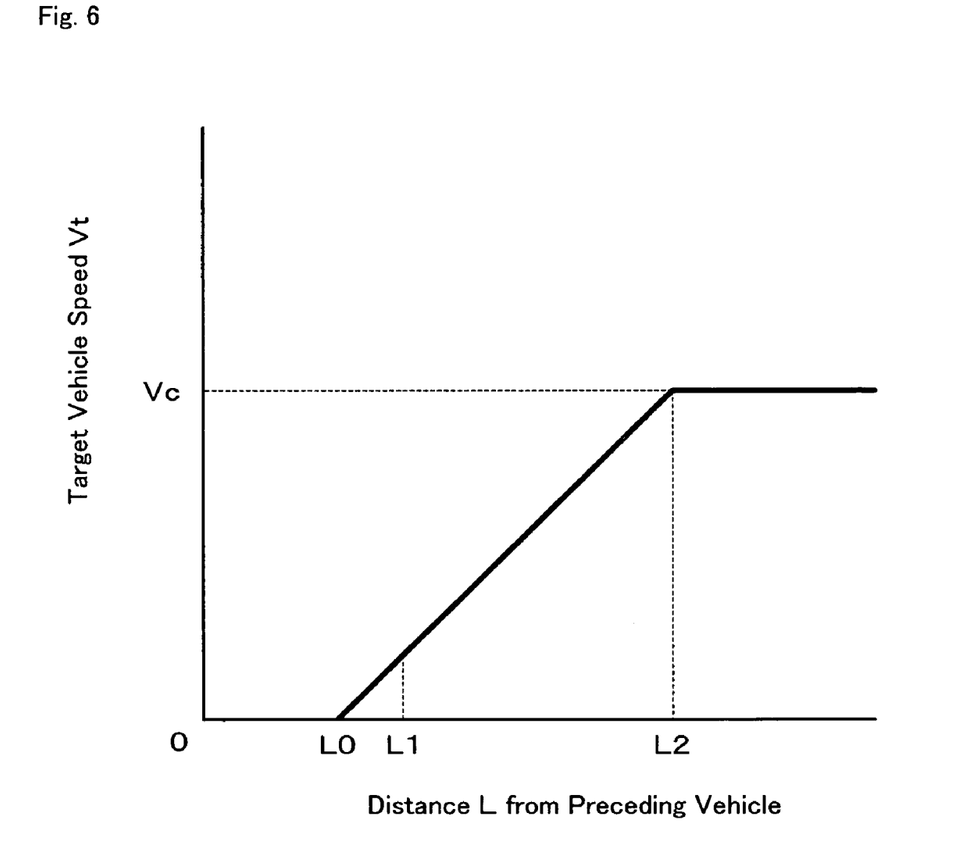
FIG. 6 is a map showing a variation in target vehicle speed Vt of the motor vehicle against distance L from the preceding vehicle.

The motor vehicle 20 of the embodiment adopts the map of FIG. 3 to set the target distance Lt from the preceding vehicle corresponding to the vehicle speed Vf of the preceding vehicle in the low vehicle speed range and performs automatic drive control to make the distance L from the preceding vehicle approach to the target distance Lt. One possible modification may adopt a map of FIG. 6 to set a target vehicle speed Vt corresponding to the distance L from the preceding vehicle and performs automatic drive control to make the vehicle speed V approach to the target vehicle speed Vt. In the map of FIG. 6, when the distance L from the preceding vehicle is not shorter than a preset reference distance L2, the target vehicle speed Vt is fixed to the driver's preset vehicle speed Vc. When the distance L from the preceding vehicle is shorter than the preset reference distance L2, the target vehicle speed Vt is varied corresponding to the distance L. When the distance L from the preceding vehicle decreases to a minimum distance L0, the target vehicle speed Vt is set equal to 0. Such setting enables the automatic drive control in the whole vehicle speed range and automatically stops the motor vehicle 20 under the condition of the distance L from the preceding vehicle equal to the minimum distance L0. After the automatic stop of the motor vehicle 20 and the engine 30, the automatic drive control may restart the engine 30 when the preceding vehicle starts to increase the distance L from the preceding vehicle to or over a preset reference distance L1 in the map of FIG. 6. The reference distance L2 may be specified empirically as a safe distance between the preceding vehicle and the motor vehicle 20 driven at the preset vehicle speed Vc.

The low vehicle speed-following drive control of the embodiment adopts the map of FIG. 3 to set the target distance Lt from the preceding vehicle corresponding to the vehicle speed Vf of the preceding vehicle. One possible modification may adopt calculation formula to calculate the target distance Lt.

Figure 4:
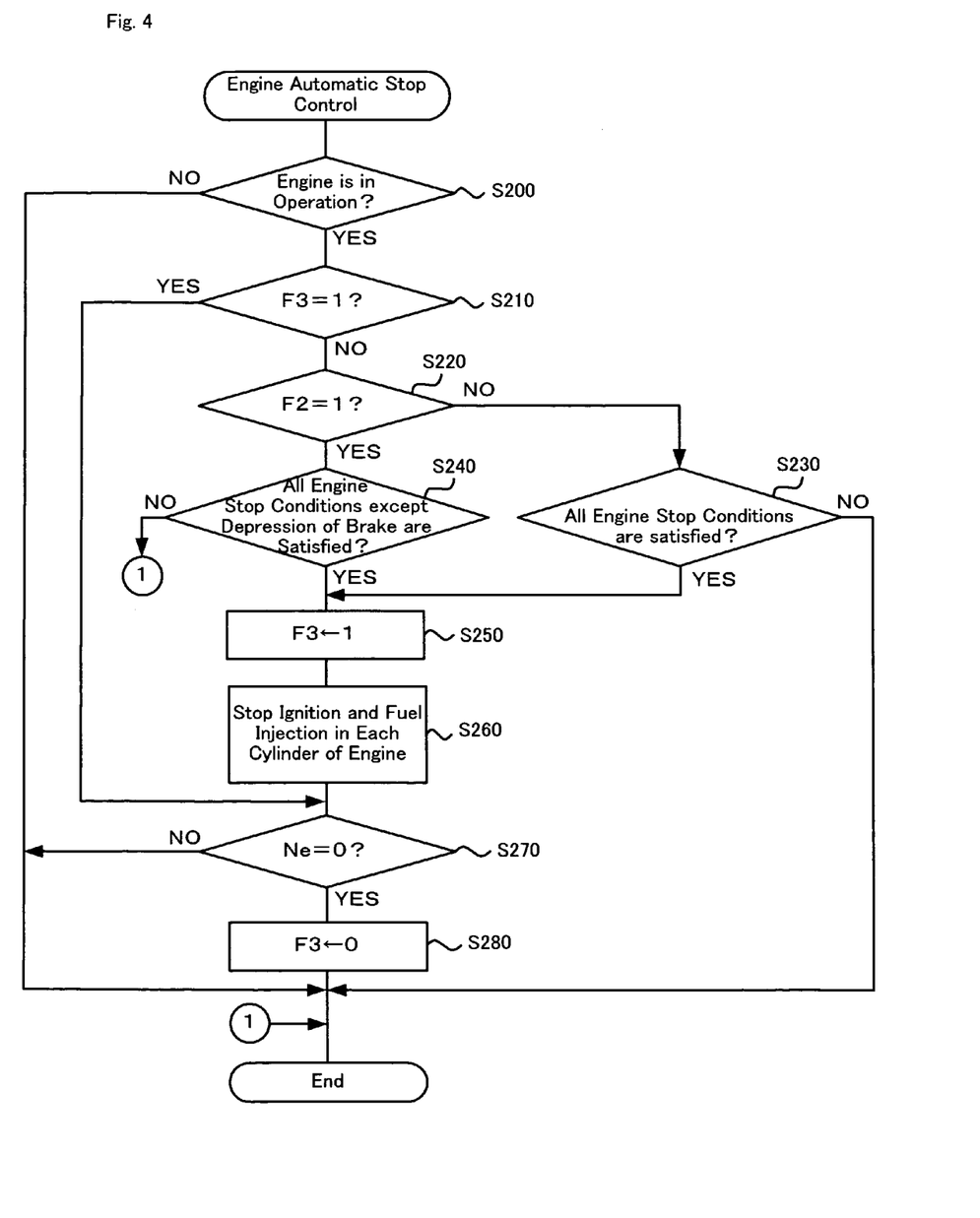
FIG. 4 is a flowchart showing an engine automatic stop control routine.

The engine automatic stop control of the embodiment excludes the driver's depression of the brake pedal 76 from the engine stop conditions at step S240 in the flowchart of FIG. 4. One modified flow of the engine automatic stop control may specify the driver's depression or release of the brake pedal 76 in response to the detection signal of the brake pedal position sensor 77 immediately before step S240. The processing flow goes to step S240 in response to detection of the driver's release of the brake pedal 76, while going to step S230 in response to detection of the driver's depression of the brake pedal 76. Similarly the engine automatic restart control of the embodiment excludes the driver's release of the brake pedal 76 from the engine restart conditions at step S320 in the flowchart of FIG. 5. One modified flow of the engine automatic restart control may specify the driver's release or depression-of the brake pedal 76 in response to the detection signal of the brake pedal position sensor 77 immediately before step S320. The processing flow goes to step S320 in response to detection of the driver's depression of the brake pedal 76, while going to step S315 in response to detection of the driver's release of the brake pedal 76.

In the motor vehicle of the embodiment described above, the laser radar sensor 65 is adopted to compute the preceding vehicle information, for example, the distance L from the preceding vehicle. The laser radar sensor 65 may be replaced by a millimeter-wave radar sensor that transmits and receives millimeter-waves. The millimeter-wave radar sensor is hardly affected by external environments even in adverse weather conditions and enables computation of the preceding vehicle information with high accuracy.

The present application claims the priority from Japanese Patent Application No. 2004-379585 filed on Dec. 28, 2004, the contents of which are hereby incorporated by reference into this application.

What is claimed is:

1. An engine automatic stop restart control apparatus mounted on a motor vehicle, the engine automatic stop restart control apparatus performing automatic engine stop control to automatically stop an engine in response to a driver's depression of brake as one of preset engine stop conditions and performing automatic engine restart control to automatically restart the engine in response to the driver's release of brake as one of preset engine restart conditions, the engine automatic stop restart control apparatus comprising:
- an automatic drive control module that performs vehicle automatic stop control to automatically stop the motor vehicle upon satisfaction of predetermined vehicle stop conditions;
- an engine stop condition judgment module that determines whether all the preset engine stop conditions except the driver's depression of brake are satisfied after an automatic stop of the motor vehicle by the vehicle automatic stop control of the automatic drive control module; and
- an engine stop control module that performs the engine automatic stop control to automatically stop the engine when the engine stop condition judgment module determines satisfaction of all the preset engine stop conditions except the driver's depression of brake,
- wherein the predetermined vehicle stop conditions include at least a condition that a vehicle speed of the motor vehicle is not higher than a preset reference vehicle speed and that a distance between the motor vehicle and a preceding vehicle is not longer than a preset reference distance,
- the automatic drive control module controls the motor vehicle to be driven at a constant speed or to follow the preceding vehicle and, in response to a stop of the preceding vehicle, controls the motor vehicle to automatically stop with maintaining the preset reference distance from the preceding vehicle.

2. The engine automatic stop restart control apparatus in accordance with claim 1, wherein the driver's depression of brake is included in the preset engine stop conditions when a gearshift lever is set in a drivable gear position.

3. The engine automatic stop restart control apparatus in accordance with claim 1, further comprising:
- a braking detection module that detects the driver's depression or release of brake,
- wherein the automatic drive control module cancels the vehicle automatic stop control by the automatic drive control module, in response to detection of the driver's depression of brake by the braking detection module.

4. The engine automatic stop restart control apparatus in accordance with claim 1, further comprising:
- an engine restart condition judgment module that determines whether the preset engine restart conditions except the driver's release of brake are satisfied in a state of sequential automatic stops of the motor vehicle and the engine by the vehicle automatic stop control of the automatic drive control module and by the engine automatic stop control of the engine stop control module;
- a distance specification module that specifies whether a distance between the motor vehicle and an obstacle located ahead of the motor vehicle is longer than a preset reference distance; and
- an engine restart control module that performs the engine automatic restart control to automatically restart the engine when the engine restart condition judgment module determines satisfaction of all the preset engine restart conditions except the driver's release of brake and the distance specification module specifies that the distance between the motor vehicle and the obstacle located ahead of the motor vehicle is longer than the preset reference distance.

5. The engine automatic stop restart control apparatus in accordance with claim 3, further comprising:
- an engine restart condition judgment module that determines whether the preset engine restart conditions except the driver's release of brake are satisfied in a state of sequential automatic stops of the motor vehicle and the engine by the vehicle automatic stop control of the automatic drive control module and by the engine automatic stop control of the engine stop control module;
- a distance specification module that specifies whether a distance between the motor vehicle and an obstacle located ahead of the motor vehicle is longer than a preset reference distance; and
- an engine restart control module that performs the engine automatic restart control to automatically restart the engine when the engine restart condition judgment module determines satisfaction of all the preset engine restart conditions except the driver's release of brake and the distance specification module specifies that the distance between the motor vehicle and the obstacle located ahead of the motor vehicle is longer than the preset reference distance.

6. The engine automatic stop restart control apparatus in accordance with claim 4, wherein the obstacle is a preceding vehicle.

7. The engine automatic stop restart control apparatus in accordance with claim 5, wherein the obstacle is a preceding vehicle.

8. The engine automatic stop restart control apparatus in accordance with claim 4, wherein the driver's release of brake is included in the preset engine restart conditions when a gearshift lever is set in a drivable gear position.

9. The engine automatic stop restart control apparatus in accordance with claim 5, wherein the driver's release of brake is included in the preset engine restart conditions when a gearshift lever is set in a drivable gear position.

10. An engine automatic stop restart control apparatus mounted on a motor vehicle, the engine automatic stop restart control apparatus performing automatic engine stop control to automatically stop an engine in response to a driver's depression of brake as one of preset engine stop conditions and performing automatic engine restart control to automatically restart the engine in response to the driver's release of brake as one of preset engine restart conditions, the engine automatic stop restart control apparatus comprising:
- an automatic drive control module that performs vehicle automatic stop control to automatically stop the motor vehicle upon satisfaction of predetermined vehicle stop conditions;
- an engine stop condition judgment module that determines whether all the preset engine stop conditions except the driver's depression of brake are satisfied after an automatic stop of the motor vehicle by the vehicle automatic stop control of the automatic drive control module;
- an engine stop control module that performs the engine automatic stop control to automatically stop the engine when the engine stop condition judgment module determines satisfaction of all the preset engine stop conditions except the driver's depression of brake; and
- a braking detection module that detects the driver's depression or release of brake, wherein the automatic drive control module cancels the vehicle automatic stop control by the automatic drive control module, in response to detection of the driver's depression of brake by the braking detection module.

11. An engine automatic stop restart control apparatus mounted on a motor vehicle, the engine automatic stop restart control apparatus performing automatic engine stop control to automatically stop an engine in response to a driver's depression of brake as one of preset engine stop conditions and performing automatic engine restart control to automatically restart the engine in response to the driver's release of brake as one of preset engine restart conditions, the engine automatic stop restart control apparatus comprising:

an automatic drive control module that performs vehicle automatic stop control to automatically stop the motor vehicle upon satisfaction of predetermined vehicle stop conditions;

an engine stop condition judgment module that determines whether all the preset engine stop conditions except the driver's depression of brake are satisfied after an automatic stop of the motor vehicle by the vehicle automatic stop control of the automatic drive control module;

an engine stop control module that performs the engine automatic stop control to automatically stop the engine when the engine stop condition judgment module determines satisfaction of all the preset engine stop conditions except the driver's depression of brake;

an engine restart condition judgment module that determines whether the preset engine restart conditions except the driver's release of brake are satisfied in a state of sequential automatic stops of the motor vehicle and the engine by the vehicle automatic stop control of the automatic drive control module and by the engine automatic stop control of the engine stop control module;

a distance specification module that specifies whether a distance between the motor vehicle and an obstacle located ahead of the motor vehicle is longer than a preset reference distance; and an engine restart control module that performs the engine automatic restart control to automatically restart the engine when the engine restart condition judgment module determines satisfaction of all the preset engine restart conditions except the driver's release of brake and the distance specification module specifies that the distance between the motor vehicle and the obstacle located ahead of the motor vehicle is longer than the preset reference distance.

\* \* \* \* \*